UNITED STATES PATENT OFFICE.

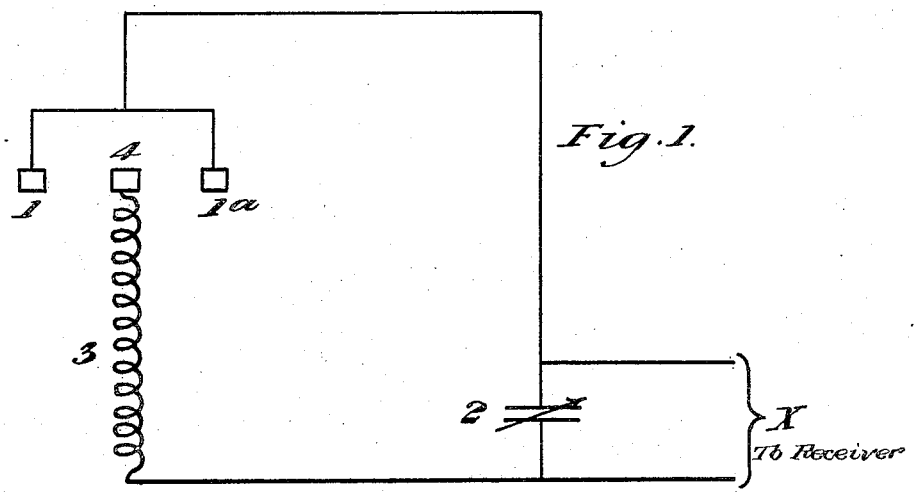
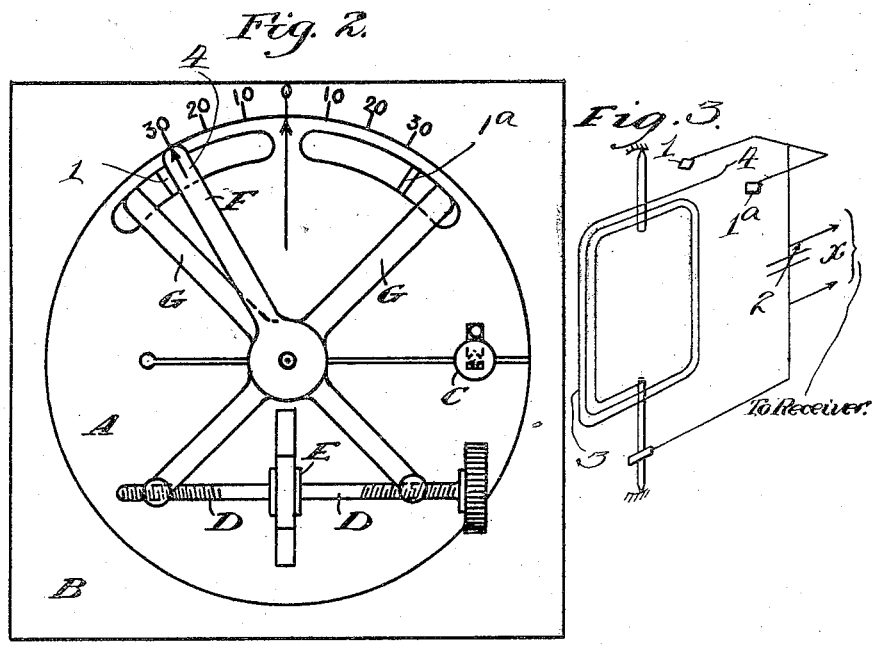

JAMES ERSKINE-MURRAY AND JAMES ROBINSON, OF BIGGIN HILL, ENGLAND.

ELECTROMAGNETIC-WAVE NAVIGATIONAL SYSTEM.

1,342,257. Specification of Letters Patent. Patented June 1, 1920.

Application filed December 16, 1919. Serial No. 345,349.

*To all whom it may concern:*

Be it known that we, JAMES ERSKINE-MURRAY and JAMES ROBINSON, both subjects of the King of Great Britain, both residing in Biggin Hill, England, have jointly invented certain new and useful Improvements in Electromagnetic - Wave Navigational Systems, of which the following is a specification.

The present invention relates to electromagnetic wave navagational systems.

The direction of propagation of electromagnetic waves emitted from an external source may be determined by varying the orientation of a conductor in the oscillating field produced directly or indirectly at a receiving station by the waves. This conductor may conveniently be a closed coil in series with a condenser forming a tunable circuit and connected with a suitable receiver. Owing to the fact that the strength of the received current or signal varies more rapidly when the coil is turned in the neighborhood of the position of zero or minimum induced current it is usual to determine the direction of the waves by varying the orientation of the coil until this condition is obtained. The orientation of the axis of the coil for minimum signals then indicates the direction of propagation of the waves.

This method has the disadvantage, firstly that it is impossible to read the signals when on the position of minimum strength, and secondly that it is not suitable for use in aircraft, or in other situations in which extraneous noises make it difficult to determine the actual minimum of the signals since these are, in general, very weak in the neighborhood of the minimum and may appear to die away altogether at a substantial angular distance on either side of it.

Again, if an attempt is made to determine the minimum by turning the coil from side to side between positions of equal signal strength these are very difficult to distinguish owing to the gradual increase of strength as the coil is moved away from the minimum rendering it impossible to make a direct comparison of two reasonably strong signals.

The object of this invention is to provide means whereby the intensity of the signal at two points, one on either side of the minimum, may be directly compared by cutting out signals of intermediate intensities.

The invention consists in providing means whereby the rotatable coil of a directive electromagnetic reception device and its pointer or indicator are free to move with respect to each other within determined limits, contacts being provided to constitute the limiting stops and also complete the receiving circuit.

The pointer or indicator is movable relatively to the rotatable coil over a certain angle which is determined by the position of the stops and its position determines the limits of the angles which the rotatable coil can form with the direction line of the signal.

The invention is equally applicable to a direction finding system comprising an electromagnetic coupling device, such as a radiogoniometer, in which case, the indicator stops determine the limits of the angles which the rotatable coil or condenser can form with the two fixed elements of the apparatus.

It will be seen that by this invention signals will be audible only when the rotatable element is in contact with either of the studs or contacts and that if the pointer or indicator be moved until equal intensity of signal is observed at the two stops, the minimum intensity direction line must bisect the angle contained between the two positions. As the intensity of the incoming waves varies according to the distance from the source and other factors, the distance apart of the stops is preferably adjustable.

In order that the construction and action of our invention may be the more clearly understood, reference is made to the accompanying drawings in which Figure 1 is a diagrammatic representation of the wiring as used either directly on a loop aerial or the movable coil of a radiogoniometer. Fig. 2 is a plan view of one form of indicator in accordance with this inventor, showing the mechanical details of construction. Fig. 3 is a diagrammatic perspective view corresponding with Fig. 1.

In Figs. 1 and 3 the two contact stops 1, 1ª, are jointly connected to one side of the tuning condenser 2, the other side of which is connected to the aerial coil or rotatable radiogoniometer coil 3, the circuit being completed by contact 4 and either of contacts 1, 1ª. The receiver or amplifier is connected in any suitable method as by leads X across the condenser 2.

In Fig. 2 a rotatable disk A is mounted on a base B, provision being made to clamp it in any desired position by means of a clamping screw C. A scale marked off in degrees is provided on the base B around the disk A. Two contact arms G are centrally mounted on the disk A and their distance apart is adjustable as by means of the left and right hand screw D having a central bearing E. A contact arm F rigidly connected with the rotatable aerial coil or rotatable radiogoniometer coil forming one terminal of the winding thereof, is rotatable about the same axis as the disk A between the contact stops 1 and 1$^a$.

In using such an apparatus for the purpose contemplated in this invention, the pointer F (and with it the rotatable aerial or radiogoniometer coil) is rotated about the common axis of the apparatus until the pointer is midway between the contact stops 1 and 1$^a$. The disk A is unclamped and rotated, carrying with it coil, pointer and contact, while the pointer F is simultaneously oscillated between contacts 1 and 1$^a$ until a position of the platform is found at which signals are of equal intensity with the pointer F in the two limiting positions against the stops 1 and 1$^a$. If the pointer F is then set midway between the stops it will give the direction of the electromagnetic waves producing the signals, and the actual bearing of the transmitting station can be readily ascertained.

Having thus described the nature of the said invention and the best means we know of carrying the same into practical effect, we claim:—

1. In a device for determining the direction of propagation of electromagnetic waves which depends upon the determination of the position of a rotatable element which would give minimum strength of signals by comparison of the relative strengths of signals produced on either side of the minimum position, means whereby intermediate signals are automatically cut out in oscillating the rotatable element between the two positions of comparison.

2. In electromagnetic wave reception apparatus having a rotatable element which can be adjusted to positions so that the oscillations induced therein by the electromagnetic waves range from a maximum to a minimum, stops for limiting the movement of the rotatable element, means for rotating the said stops relatively to the rotatable element so that they lie equidistant at each side of the position of the rotatable element at which the oscillations induced therein are of minimum or maximum intensity, and means whereby the receiving circuit is completed only when the rotatable element is at the limits of its movement, as and for the purpose described.

3. Electromagnetic wave reception apparatus as claimed in claim 2, in which the stops are adjustable relatively to each other as and for the purpose described.

4. The herein described method of determining the direction of propagation of electromagnetic waves received from an external source by determining the position of a rotatable coil in which the signals due to the received waves have minimum intensity by the direct comparison of two moderately strong signals, one on either side of the minimum, which consists in rotating the coil until the two aforesaid signals are of equal intensity and concurrently cutting out signals of intermediate intensities.

In testimony whereof we have signed our names to this specification.

JAMES ERSKINE-MURRAY.
JAMES ROBINSON.